T. GOODREM.
Fork, Spade, Hoe and Rake.
No. 39,012. Patented June 23. 1863.
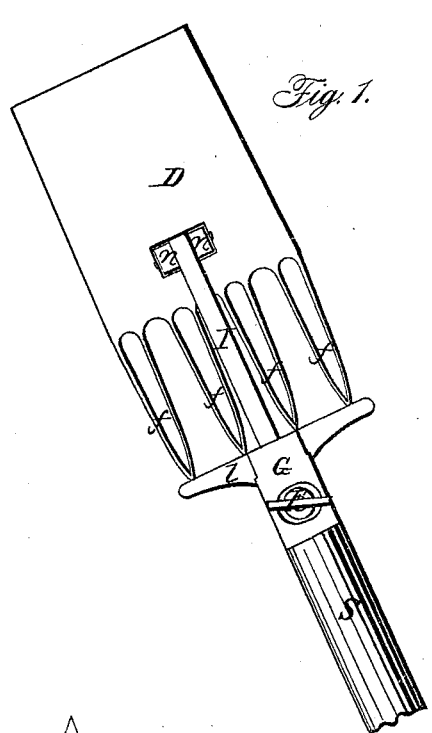
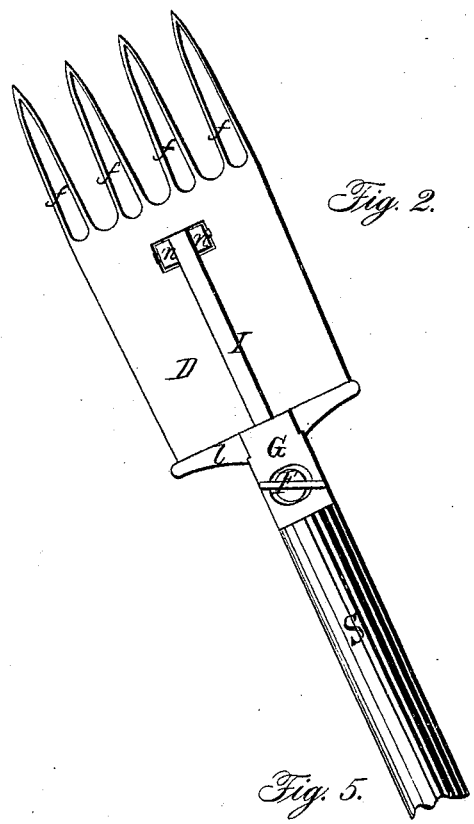
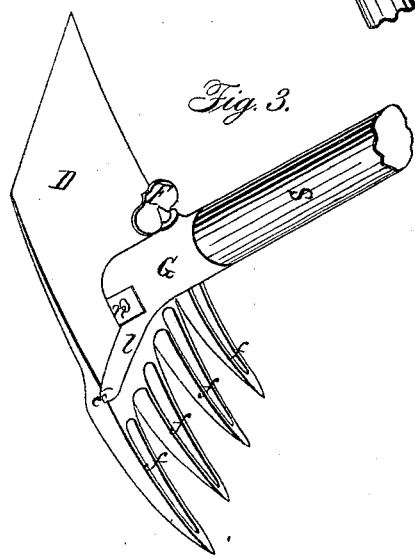
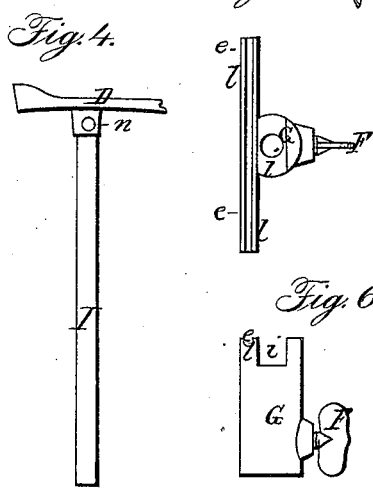
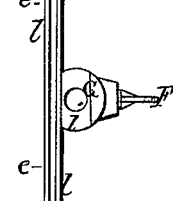
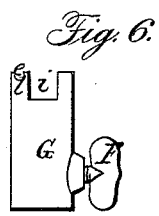
Witnesses:
Isaac H. Bonnell
Thomas D Mason
Inventor:
Thomas Goodrem

UNITED STATES PATENT OFFICE.

THOMAS GOODREM, OF PROVIDENCE, ASSIGNOR TO JOHN BARNES, OF NORTH PROVIDENCE, RHODE ISLAND.

COMBINED SPADE, FORK, HOE, AND RAKE.

Specification forming part of Letters Patent No. 39,012, dated June 23, 1863.

*To all whom it may concern:*

Be it known that I, THOMAS GOODREM, of Providence, in the county of Providence and State of Rhode Island, have invented a new and Improved Combined Spade, Fork, Hoe, and Rake for Horticultural Purposes; and I do hereby declare that the following is a full, clear, and exact description of the same, reference being had to the annexed drawings, making part of this specification, in which—

Figure 1 represents the implement arranged as a spade. Fig. 2 represents the same arranged as a fork. Fig. 3 represents the same arranged as a hoe and rake. Figs. 4, 5, and 6 are details which are referred to as the description proceeds.

Similar letters of reference indicate corresponding parts in all the figures.

This improvement belongs to that class of inventions in which, by means of a peculiar and novel construction and arrangement, two or more devices or implements for kindred purposes are conveniently and economically combined in one.

The close resemblance between the blades of a spade and a hoe and between the tines or teeth of a fork and those of a rake suggests the combination of the four implements in one, and the invention in this case rests in the combination of the said implements, substantially as and with the effect hereinafter set forth— that is to say:

I construct the blade D and tines $fff$ of one piece of metal—say of cast-iron—as shown in Figs. 1, 2, 3, the sharp thin edge of the said blade being situated at the opposite extremity of the piece from the points of the said tines $ffff$, and the said piece of metal may be pivoted, by means of the square projections $n$ $n$ formed in the middle of the same, to a round rod or spindle, I, Figs. 1, 2, and 4. This rod is inserted in the socket-piece G, Fig. 5, thus providing for a swiveling movement of the piece D and a consequent changing of its position in a manner to present the edge of the blade foremost as a spade, the tines $f$ foremost as a fork, or the two at right angles with the socket-piece and handle S as a combined hoe and rake. In order to hold the piece D in one of the positions firmly when desired, the said socket-piece is formed with a support, $l$, with a groove, $e$, formed therein to receive the edge of the blade or the point of the tines $f$, as shown in Figs. 1 and 2, when the implement is to be used as a spade or a fork; and, besides this, a square recess, $i$, Figs. 5 and 6, is formed in the said socket-piece, for the reception of the square projections $n$ $n$, Fig. 3, when the implement is to be used as a hoe or rake, while a suitable thumb-screw, F, confines the spindle I in the socket-piece, and thus secures the piece D in either position, as may be desired.

Having thus described my invention, I claim substantially—

The within-described combined spade, fork, hoe, and rake as a new article of manufacture.

THOMAS GOODREM.

Witnesses:
 ISAAC A. BROWNELL,
 THOS. D. MASON.